United States Patent [19]
Müller et al.

[11] Patent Number: 4,966,069
[45] Date of Patent: Oct. 30, 1990

[54] NOZZLE OUTLET

[75] Inventors: Gottfried Müller; Paul Hipp, both of Kolbingen, Fed. Rep. of Germany

[73] Assignee: Schako Metallwarenfabrik Ferdinand Schad KG, Kolbingen, Fed. Rep. of Germany

[21] Appl. No.: 431,461

[22] Filed: Nov. 3, 1989

[30] Foreign Application Priority Data

Nov. 12, 1988 [DE] Fed. Rep. of Germany ....... 3838419

[51] Int. Cl.$^5$ ........................................... F24F 13/068
[52] U.S. Cl. ................................... 98/40.11; 98/40.18
[58] Field of Search .................... 98/40.1, 40.11, 40.18

[56] References Cited

FOREIGN PATENT DOCUMENTS 149203 7/1985 European Pat. Off. ........... 98/40.18
164738 12/1985 European Pat. Off. ........... 98/40.11

*Primary Examiner*—Harold Joyce
*Attorney, Agent, or Firm*—Bachman & LaPointe

[57] ABSTRACT

A nozzle outet for the introduction of warm and/or cold air into a room wherein a plurality of individual nozzles is arranged in an outlet housing. In a preferred embodiment a large number of relatively small individual nozzles are employed. In a further improved embodiment the nozzle azes of the individual nozzles extend and incline toward each other or towards a central axis of the outlet housing.

9 Claims, 1 Drawing Sheet

NOZZLE OUTLET

BACKGROUND OF THE INVENTION

The invention relates to a nozzle outlet for the introduction of warm and/or cold air into a room.

Nozzle outlets of this kind are known in many forms. In most cases, they form the end of the guide passing the warm or cold air through an air conditioning plant or similar construction. These outlets are essentially adapted to fit certain corresponding requirements of the room. They may be a slot outlet, grid outlet or even an individual nozzle outlet. Such individual nozzles are known, for example, from buses or airplanes. There spherical individual nozzles can be adjusted such that they are directed onto a certain seat.

The inventors have set themselves the aim of improving an outlet of the abovementioned kind in such a way that a good mixture of additional air is obtained into the air present in the room and a relatively rapid temperature decrease or increase can take place.

SUMMARY OF THE INVENTION

To achieve this aim, a plurality of individual nozzles is arranged in an outlet housing.

Preferably these should be a large number of relatively small individual nozzles. By this means, many individual induction zones are produced between the individual nozzles, by which means a very good mixture of the additional air into the air in the room is permitted. This in turn then effects the accelerated temperature decrease or increase.

Furthermore, due to the many individual nozzles, directed long-range air jets are achieved such that the introduced air is rapidly introduced into far distances of the room.

For the introduction of cold air it is provided that, if desired, the additional amount of air is reduced by a pole-change motor, such that, if desirable, substantially less air can flow in via the same outlet.

A further essential feature of the present invention is that the nozzle axes of the individual nozzles can extend inclined towards each other or towards a central axis of the outlet housing.

Additionally, it is conceived that in turn the nozzle axes of the individual nozzles will have a different inclination towards the central axis. By this means, any desire can be met depending on where in the room the nozzle outlet is provided and depending on what requirements the individual nozzles are to fulfill.

Preferably, a plurality of individual nozzles is provided on nozzle rails. In this case, the nozzle axes of the individual nozzles of each nozzle rail can have the same inclination.

Individual nozzles or nozzle rails are connected to the outlet housing via fastening brackets. In this case, each fastening bracket consists of a support leg and a fastening leg. The latter engages in a receiving slot of the individual nozzle or nozzle rail. By this means, the individual nozzle or nozzle rail is connected to the fastening bracket. To determine the inclination of the nozzle axis, support leg and fastening leg have a predetermined angle. If, for example, this angle is 90°, the nozzle axis extends parallel to the central axis of the outlet housing. However, depending on the desired inclination, the corresponding angles between support leg and fastening leg are adjustable. This is done by simple tilting of the fastening bracket.

These fastening brackets also have the advantage that individual nozzles or nozzle rails can be inserted into present frames of a nozzle outlet, the length of this frame also determining the number of individual nozzles to be accommodated.

The individual nozzles or nozzle rails themselves are connected to one another via a fastening rail. For reasons of simplicity, this fastening rail in turn consists of two rail legs which engage in corresponding receiving slots in the individual nozzle or nozzle rail.

In order to be able to meet a required inclination of the nozzle axes towards each other, the fastening rail has a central embossing, via which the rail legs receive an angular position to the central axis which corresponds to the angle between support leg and fastening leg of the fastening bracket.

A nozzle outlet of this kind can be designed for insertion in circular pipes in rectangular channels or for square or round ceiling panels, with or without ball protection. It is variable in use as the individual nozzles are readily and simply adjustable.

BRIEF DESCRIPTION OF THE DRAWINGS

Further advantages, features and details of the invention are described below with reference to preferred exemplary embodiments and the drawing, in which.

DETAILED DESCRIPTION

Figure 1:
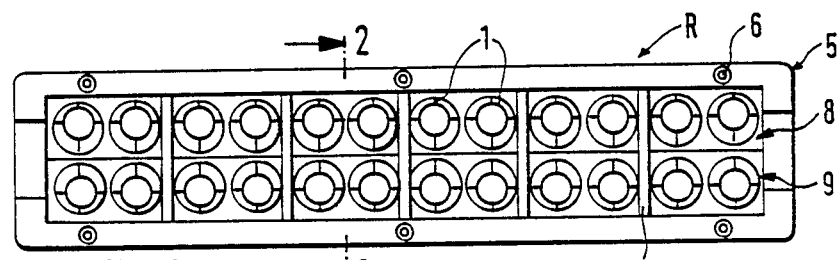
FIG. 1 shows a bottom view of a nozzle outlet according to the invention.

A nozzle outlet R has a multiplicity of individual nozzles 1 which are arranged in two rows according to the exemplary embodiment of FIG. 1. Each individual nozzle 1 is connected to an outlet housing 3 via a fastening bracket 2 (see FIG. 2). The required connection is made by any means of fastening which is indicated at 4.

The outlet housing 3 has an annular collar 5, into which corresponding holes 6 are punched which serve, for example, to receive flat-head screws. The nozzle outlet is fastened to a ceiling via these screws.

Furthermore, transverse webs 7 are provided in the outlet housing 3, which serve as a protection for the individual nozzles 1, for example, against ball impact.

According to FIG. 1, two nozzle rails 8 and 9 are inserted into the outlet housing 3, the respective individual nozzles 1 of these nozzle rails 8 and 9 pointing in different directions. This means that the nozzle axes 10 and 11 enclose a certain angle which, for reasons of clarity, is not shown in FIG. 2, each nozzle axis 10 or 11 extending, however, in an acute angle to the central axis A of the nozzle outlet R.

Each fastening bracket 2 consists of a support leg 12, connected to the outlet housing 3 via the means of fastening 4, as well as a fastening leg 13 assigned to the individual nozzle 1. This fastening leg 13 engages in a receiving slot 14 of the individual nozzle 1 or of the nozzle rail 8 or 9. The inclination of the nozzle axis 10 or 11 towards the central axis A is determined by the angle w which is enclosed by the fastening leg 13 and the support leg 12.

Figure 2:
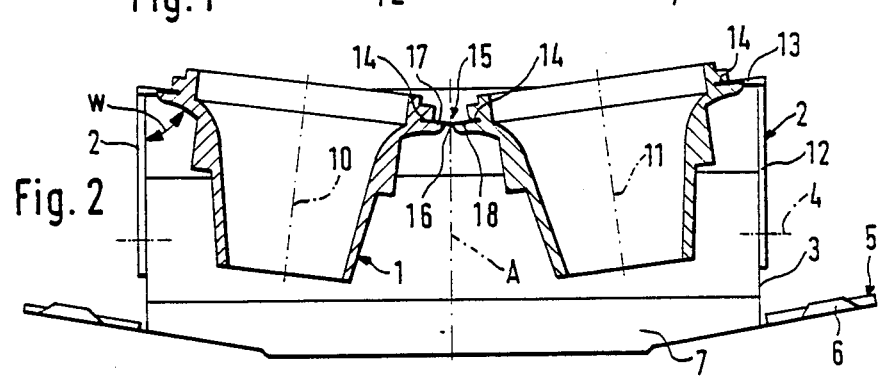
FIG. 2 shows an enlarged cross section through the nozzle outlet according to FIG. 1 along line 2—2.

Also between the individual nozzles 1 or the nozzle rail 8 and 9 there is a fastening rail 15 which, in the exemplary embodiment according to FIG. 2, has a central embossing 16, by which means in turn two rail legs 17 and 18 are formed which engage in the same type of receiving slots 14 of each individual nozzle 1. The angle of the central embossing 16 is formed in such a way that each rail leg 17 or 18 encloses an angle, corresponding to the angle w, with the central axis A.

Figure 3:
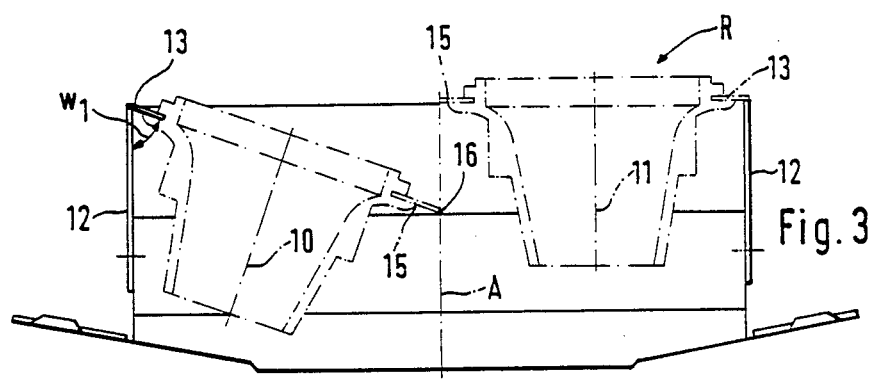
FIG. 3 shows an enlarged cross section through the nozzle outlet according to FIG. 1 corresponding to FIG. 2, but with different positions of the individual nozzles.

FIG. 3 shows an exemplary embodiment of the nozzle outlet R, with which the nozzle axes 10 or 11 enclose a different angle to the central axis A. In the right half, the nozzle axis 11 extends parallel to the central axis A. For this reason, an angle of 90° is also enclosed by fastening leg 13 and support leg 12. In this case the fastening rail 15 does not have a central embossing, such that the rail legs 17 and 18 extend in one plane.

In contrast to this, the nozzle axis 10 of the exemplary embodiment in the left half of FIG. 3 extends with substantially greater inclination to the central axis A. The angle w: between fastening leg 13 and support leg 12 must also be formed with the corresponding inclination. To the same extent, the fastening rail 15 has a corresponding central embossing 16.

Figure 4:
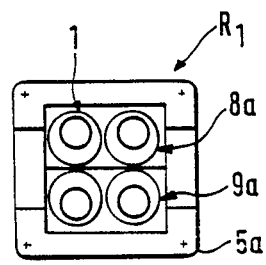
FIG. 4 shows a bottom view of a further exemplary embodiment of a nozzle outlet.
Figure 5:
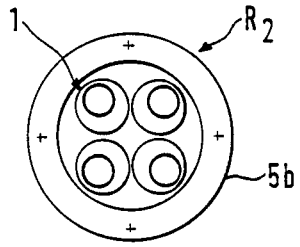
FIG. 5 shows a bottom view of a further exemplary embodiment of a nozzle outlet.

Corresponding nozzle rails 8a and 9a are also shown in the nozzle outlet $R_1$ according to FIG. 4. There, however, only two individual nozzles 1 are provided per nozzle rail 8a and 9a. These nozzle rails 8a and 9a are surrounded by an approximately square annular collar 5a, such that a square ceiling panel, for example, can be replaced by this nozzle outlet $R_1$.

Similar to that in FIG. 4, the corresponding individual nozzles 1 can also be used with a circular nozzle outlet $R_2$. In this case, the annular collar 5b is circular. The fastening brackets (not shown) must then be correspondingly tilted, in which case it will prove to be necessary to construct the fastening rails (likewise not shown) corresponding to a desired inclination of the nozzle axes.

We claim:

1. A nozzle outlet for the introduction of warm and/or cold air into a room which comprises: an outlet housing having a central axis; a plurality of individual nozzles arranged in said outlet housing and having nozzle axes with an inclination; nozzle rails connected to said outlet housing; fastening brackets connecting at least one of said individual nozzles and nozzle rails to the outlet housing, said fastening brackets having a support leg and a fastening let; a receiving slot in one of said nozzles and nozzle rails engaging the fastening leg; wherein the support leg and fastening leg enclose an angle (w) to determine the inclination of the nozzles.

2. A nozzle outlet according to claim 1 including a plurality of second individual nozzles arranged in said outlet housing and having nozzle axes, wherein the nozzle axis of each of said second nozzles extends towards the central axis of the outlet housing.

3. A nozzle outlet according to claim 1 wherein said plurality of individual nozzles are provided on said nozzle rails.

4. A nozzle outlet according to claim 3 wherein said plurality of individual nozzles have the same inclination.

5. A nozzle outlet according to claim 2 wherein said plurality of individual nozzles are provided on said nozzle rails.

6. A nozzle outlet according to claim 1 wherein the individual nozzles are connected to the outlet housing via said fastening brackets.

7. A nozzle outlet according to claim 1 including a fastening rail connecting at least one of said individual nozzles and nozzle rails to one another.

8. A nozzle outlet according to claim 7 wherein the fastening rail has two rail legs which engage in said receiving slots.

9. A nozzle outlet according to claim 8 wherein said fastening rail has a central embossing via which the rail legs are inclined at an angle towards the central axis of the outlet housing corresponding to the angle (w).

* * * * *